No. 807,440. PATENTED DEC. 19, 1905.
J. M. CONROY.
SUPPORT FOR MIRRORS.
APPLICATION FILED JULY 28, 1905.
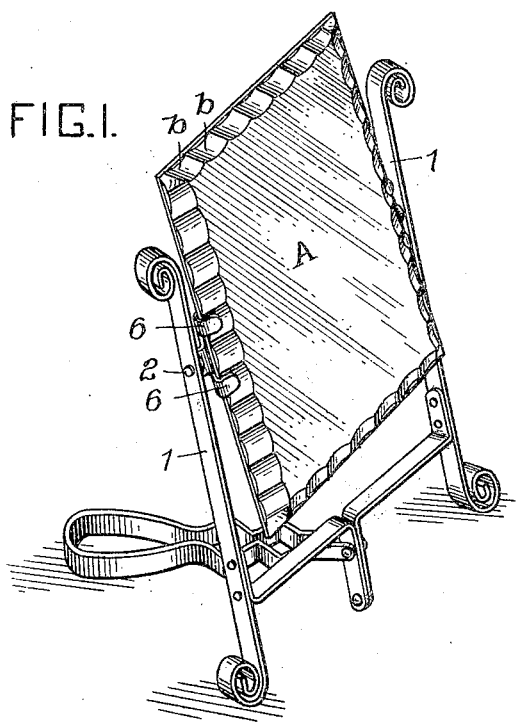
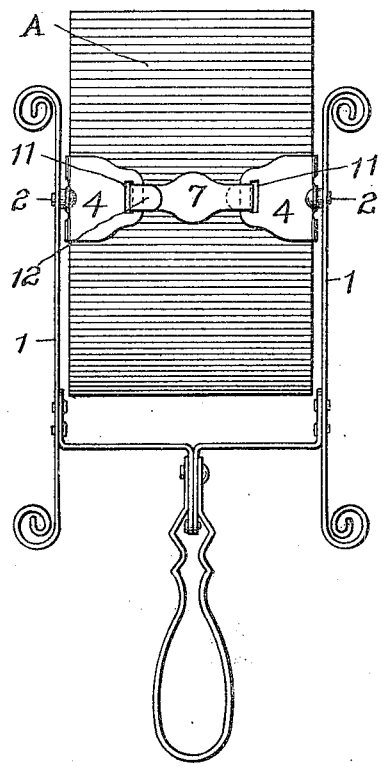
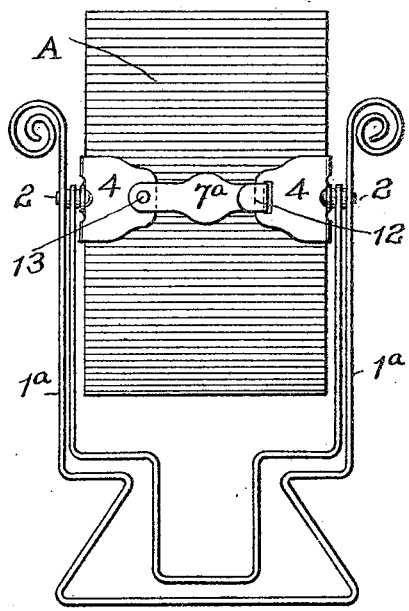
WITNESSES:
Herbert Bradley.
Francis Vernau.
INVENTOR
John M. Conroy
by Christy and Christy
Atty's

UNITED STATES PATENT OFFICE.

JOHN M. CONROY, OF ALLEGHENY, PENNSYLVANIA.

SUPPORT FOR MIRRORS.

No. 807,440.  Specification of Letters Patent.  Patented Dec. 19, 1905.

Application filed July 28, 1905. Serial No. 271,669.

*To all whom it may concern:*

Be it known that I, JOHN M. CONROY, a citizen of the United States, residing at Allegheny, in the county of Allegheny and State of Pennsylvania, have invented or discovered certain new and useful Improvements in Supports for Mirrors, of which improvements the following is a specification.

My invention relates to improvements in supports for mirrors; and the object of my improvements is to provide a mirror-support which will be simple and efficient in use and one which may be made at small cost.

In the accompanying drawings, which form part of this specification, Figures 1 and 2 show in perspective and in rear elevation a mirror equipped with my improved support, and Fig. 3 shows in rear elevation another mirror equipped with my improved support in slightly-modified form.

Parts repeated in the several figures bear the same reference characters in each case.

The mirror-support as it is shown in Figs. 1 and 2 consists of a standard 1 and a mount which engages the mirror itself, A, and is carried by the standard. My invention is primarily concerned with this mount. The mount consists of a pair of clips and means for connecting them. This connection is made adjustable to allow for irregularity of the mirrors in size, as well as for purposes of ready and economic assembling of parts. In my preferred construction the clips engage the edge of the mirror upon opposite sides, and their body portions 4 extend inward from the edge upon the back of the mirror. A strap 7 (preferably formed of metal) makes slot-and-tongue connection with the body portions 4 of the oppositely-placed clips, a slot 11 being formed in the clip and the strap 7 being prolonged in a tongue 12.

My improved mount is particularly applicable to mirrors with what are termed "chipped-bevel" edges. The edges of these mirrors are formed by cleaving from the plates of glass of which the mirrors are formed successive chips, leaving edges which are inclined or beveled, and the bevel broken or interrupted in a series of scallops or indentations $b$. The clips of the mount may be provided with lugs 6, which enter and engage these indentations, and such engagement when the opposite clips are connected prevents longitudinal displacement of the mirror.

I preferably form the clips of resilient metal and bend lugs 6 of each clip to form, with the body portion 4, an angle which is more acute than the angle of the bevel. In applying the clips I compress them upon the edge before securing them. Thus the resilience of the metal serves to strengthen the grasp of the mount upon the mirror.

In Fig. 2 the tie-strap 7 is shown secured to both of the oppositely-placed clips by slot-and-tongue connection. In Fig. 3 strap $7^a$ is rigidly secured at one end to one of the clips by a rivet 13 and adjustably secured at the other end by tongue and slot. This slot-and-tongue connection is further advantageous in that it permits some lateral adjustment of the clips. In mirrors having chipped-bevel edges exact uniformity in shape and position of the clips is not ordinarily obtained, and while the clips may be brought into substantially opposite positions upon the mirror-plate there are slight irregularities which may thus be compensated for.

This mount may be connected to its standard as convenience or economy or appearance dictate. In Figs. 1 and 2 lugs are formed on the clips, which make pivotal connection at 2 with the arms of standard 1. A like connection is shown in Fig. 3, the form of standard $1^a$ being in this instance modified.

I claim herein as my invention—

A mount for a mirror which consists of a pair of clips engaging the edge of the mirror upon opposite sides and extending inwardly from the edge upon the back thereof, and a tie-strap uniting said clips by slot-and-tongue connection and rigidly securing said clips in engagement with said mirror, substantially as described.

In testimony whereof I have hereunto set my hand.

JOHN M. CONROY.

Witnesses:
 CHARLES BARNETT,
 FRANCIS VERNAN.